United States Patent
Kanagaraj

(10) Patent No.: US 11,892,986 B2
(45) Date of Patent: Feb. 6, 2024

(54) ACTIVATED NEURAL PATHWAYS IN GRAPH-STRUCTURED DATA MODELS

(71) Applicant: PayPal, Inc., San Jose, CA (US)

(72) Inventor: Sudha Jenslin Kanagaraj, Sriperumbudur (IN)

(73) Assignee: PAYPAL, INC., San Jose, CA (US)

( * ) Notice: Subject to any disclaimer, the term of this patent is extended or adjusted under 35 U.S.C. 154(b) by 30 days.

(21) Appl. No.: 17/533,848

(22) Filed: Nov. 23, 2021

(65) Prior Publication Data

US 2023/0161742 A1    May 25, 2023

(51) Int. Cl.
*G06F 16/21* (2019.01)

(52) U.S. Cl.
CPC .................. *G06F 16/212* (2019.01)

(58) Field of Classification Search
CPC ....................................... G06F 16/212
USPC ......................................... 707/736
See application file for complete search history.

(56) References Cited

U.S. PATENT DOCUMENTS

| | | | | |
|---|---|---|---|---|
| 7,016,307 B2* | 3/2006 | Vasudev | ........... | H04W 4/20 370/254 |
| 7,512,612 B1* | 3/2009 | Akella | ........... | H04L 51/52 |
| 8,456,472 B2* | 6/2013 | Basak | ........... | G06T 11/20 345/440.1 |
| 10,453,074 B2* | 10/2019 | Sapoznik | ......... | G06Q 10/06311 |
| 2016/0019280 A1* | 1/2016 | Unger | ........... | G06F 16/2425 707/736 |

OTHER PUBLICATIONS

Guu,Kelvinetal."TraversingKnowledgeGraphsinVectorSpace"Proceedingsofthe2015 Conference on Empirical MethodsinNaturalLanguageProcessing, Sep. 2015, pp. 318-327.*

Guu,Kelvinetal."TraversingKnowledgeGraphsinVectorSpace"PresentedbyBenStringer, Oct. 17, 2017. 27pages.*

* cited by examiner

*Primary Examiner* — Hosain T Alam
*Assistant Examiner* — Tracy M McGhee
(74) *Attorney, Agent, or Firm* — HAYNES AND BOONE, LLP

(57) ABSTRACT

Systems and methods for determining activated neural pathways in knowledge graphs are disclosed. In an embodiment, a computer system may retrieve data associated with a user account and generate a knowledge graph centered around an account under a current adjudication. The computer system may determine paths based on the knowledge graph using similarity and sentiment scores. By reducing the amount of data in the knowledge graph to specific data associated with paths of interest, unnecessary computer operations may be avoided, which increases processing times related to the knowledge graph and allows near real-time outputs based on the knowledge graph to be utilized. The computer system may rank the paths based on their similarity scores and sentiments scores to determine which paths are considered activated neural pathways in the knowledge graph. The computer system may base a determination of the current adjudication for the account on the activated neural pathways.

20 Claims, 6 Drawing Sheets

ACTIVATED NEURAL PATHWAYS IN GRAPH-STRUCTURED DATA MODELS

TECHNICAL FIELD

The present disclosure generally relates to knowledge bases and more particularly to using a graph-structured data model to classify user account activities, according to various embodiments.

BACKGROUND

Machine learning and artificial intelligence techniques can be used to improve various aspects of decision making. Machine learning techniques often involve using available data to construct a model that can produce an output (e.g., a decision, recommendation, prediction, etc.) based on particular input data. In some instances, machine learning and artificial intelligence can be applied to allow a computer system to make an assessment regarding user account activities and whether those account activities indicate the accounts may be violating security policies and/or whether the accounts are controlled by malicious actors.

Figure 1:
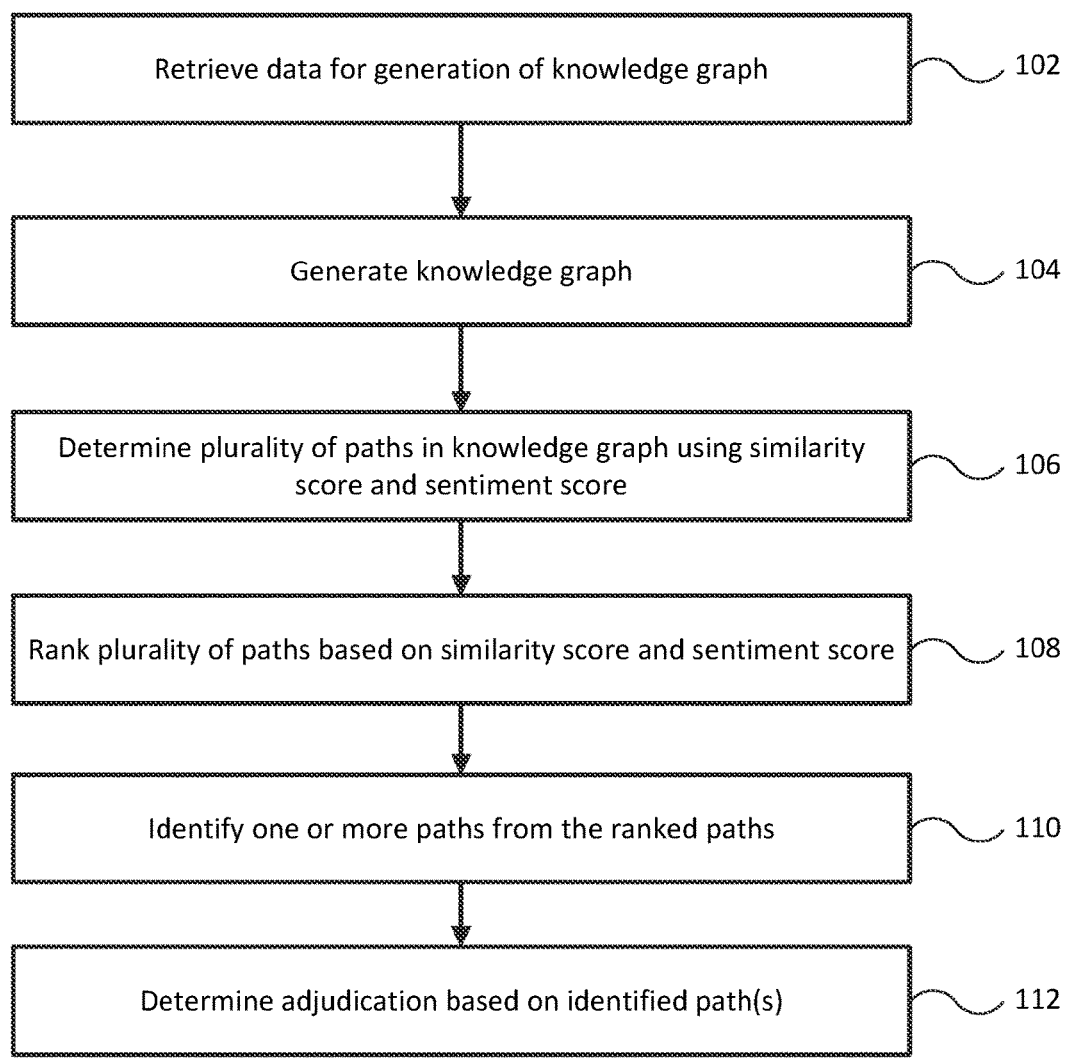
FIG. 1 illustrates a flow diagram of a process for classifying account activities using a graph-structured data model in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Free text, emojis, video, audio, stickers, and other data formats that are complex to process are becoming more prevalent in data marts. There is a demand for new methods that are adapted to understand and utilize such data formats. The present disclosure discusses how graph-structured data models (e.g., knowledge graphs) may be employed for analyzing and classifying electronic service activities, such as for fraud detection and other use cases. In one embodiment, a user account may be under an investigation by an electronic service provider for fraud. In other words, the electronic service provider computer system may perform an automated or semi-automated adjudication on the user account. The computer system may retrieve data associated with the user account from various data sources in performing the adjudication. In some cases, the data may be in various unstructured data formats. To better analyze the unstructured data, the computer system may generate a knowledge graph based on the data to place the data into a collection of interlinked descriptions (e.g., labels) of entities, which provides context to the data and enables computer analysis of the data. The entities may be referred to herein as nodes in the knowledge graph, which may be connected by edges. Labels for the edges may provide a description for how the nodes are related. A central node of the knowledge graph may correspond to the user account that is under investigation.

The computer system may determine a plurality of paths in the knowledge graph, where each path originates from the central node and may span a plurality of nodes in the knowledge graph. The plurality of paths may be referred to as the "neural pathways" of the knowledge graph according to some embodiments. As it relates to a human, a neural pathway is a series of connected neurons that send signals from one part of the brain to another. A parallel can be drawn to the plurality of paths in the knowledge graph as the computer system will determine certain nodes that are sufficiently similar by computable aspects, as discussed herein, to be considered a "neural pathway" in the knowledge graph.

The plurality of paths in the knowledge graph may be determined by analyzing the semantics in the knowledge graph to calculate multi-node similarity scores. In other words, the computer system may draw meaning from the text of the labels of nodes and/or edges in the knowledge graph. For example, the computer system may evaluate the semantics of nodes for a prospective path to calculate similarity scores between the nodes. Nodes that are closely associated in terms of their semantics may have a similarity score that satisfies a threshold and can be added to a path. The computer system may continue to add nodes to a prospective path where the similarity score between the last node in the path and the node to be added satisfies the threshold. This process of adding nodes may be thought of as building a "neural pathway" in the knowledge graph.

The "neural pathways" may be considered prospective paths that can be "activated." Thus, the neural pathways may further be analyzed to calculate a sentiment score for nodes in the neural pathway. If nodes share a similar sentiment score (meet a threshold similarity in sentiment), it may be an indication that they are similar in sentiment (e.g., positive, negative, or neutral). A neural pathway that has sentiment scores amongst its nodes that are very similar, e.g., within a predetermined threshold, may be an indication of an "activated neural pathway." Thus, activated neural pathways may be nodes in the knowledge graph that are very similar in semantics and sentiment and comprise the plurality of paths determined in the knowledge graph. The computer system may use the activated neural pathways as an indication for how the user account under adjudication should be adjudicated. For example, the computer system may rank the activated neural pathways to determine which pathways are the strongest (e.g., have the most closely associated similarity scores and sentiment scores).

A node in a highest-ranked activated neural pathway may correspond to another user account that has previously been adjudicated. The computer system may tag the activated neural pathway with a source identifier corresponding to the other user account which has been previously adjudicated. As an example, the activated neural pathway may be tagged with a source identifier that identifies a data source that indicates that the other user account was restricted by the electronic service provider because the other user account was concluded to have been engaged in fraudulent activity using the electronic service provider's platform. The computer system may use the previous adjudication of the other user account to make a recommendation for the user account that is under a current adjudication, because according to the activated neural pathway, the user account under the current adjudication is closely associated with the other user account. Further details and additional embodiments are described below in reference to the accompanying figures.

Technical Benefits

Aspects described below improve the functioning of a computer system in at least the following ways. As knowledge graphs scale to be very large, processing such knowledge graphs can become computationally complex. By using multi-node similarity and sentiment scores as discussed herein, a computer system may efficiently process the data associated with a large knowledge graph by limiting computer processing to activated neural pathways in which nodes that satisfy thresholds used for similarity and sentiment are included while nodes that fail to satisfy such thresholds are omitted. By reducing the amount of data in the large knowledge graph to specific data associated with activated neural pathways of interest, unnecessary computer operations may be avoided, which increases processing times related to the knowledge graph and allow near real-time outputs based on the knowledge graph to be utilized. For example, near real-time outputs based on the knowledge graph may be needed to quickly adjudicate a user account prior to the user account performing an action, such as conducting an electronic transaction with another account, so that there is minimal service delay experienced by the user account.

Referring now to FIG. 1, illustrated is a flow diagram of a process 100 for entity adjudication using knowledge graphs in accordance with one or more embodiments of the present disclosure. The blocks of process 100 are described herein as occurring in serial, or linearly (e.g., one after another). However, multiple blocks of process 100 may occur in parallel. In addition, the blocks of process 100 need not be performed in the order shown and/or one or more of the blocks of process 100 need not be performed. For explanatory purposes, process 100 is primarily described herein with reference to FIGS. 2-4.

It will be appreciated that first, second, third, etc. are generally used as identifiers herein for explanatory purposes and are not necessarily intended to imply an ordering, sequence, or temporal aspect as can generally be appreciated from the context within which first, second, third, etc. are used.

In some embodiments, the process 100 may be performed by a computer system having at least a non-transitory memory (e.g., a machine-readable medium) and one or more hardware processors configured to read instructions from the non-transitory memory to cause the system to perform the process 100. For example, the computer system may include one or more computer systems 600 of FIG. 6.

Figure 2:
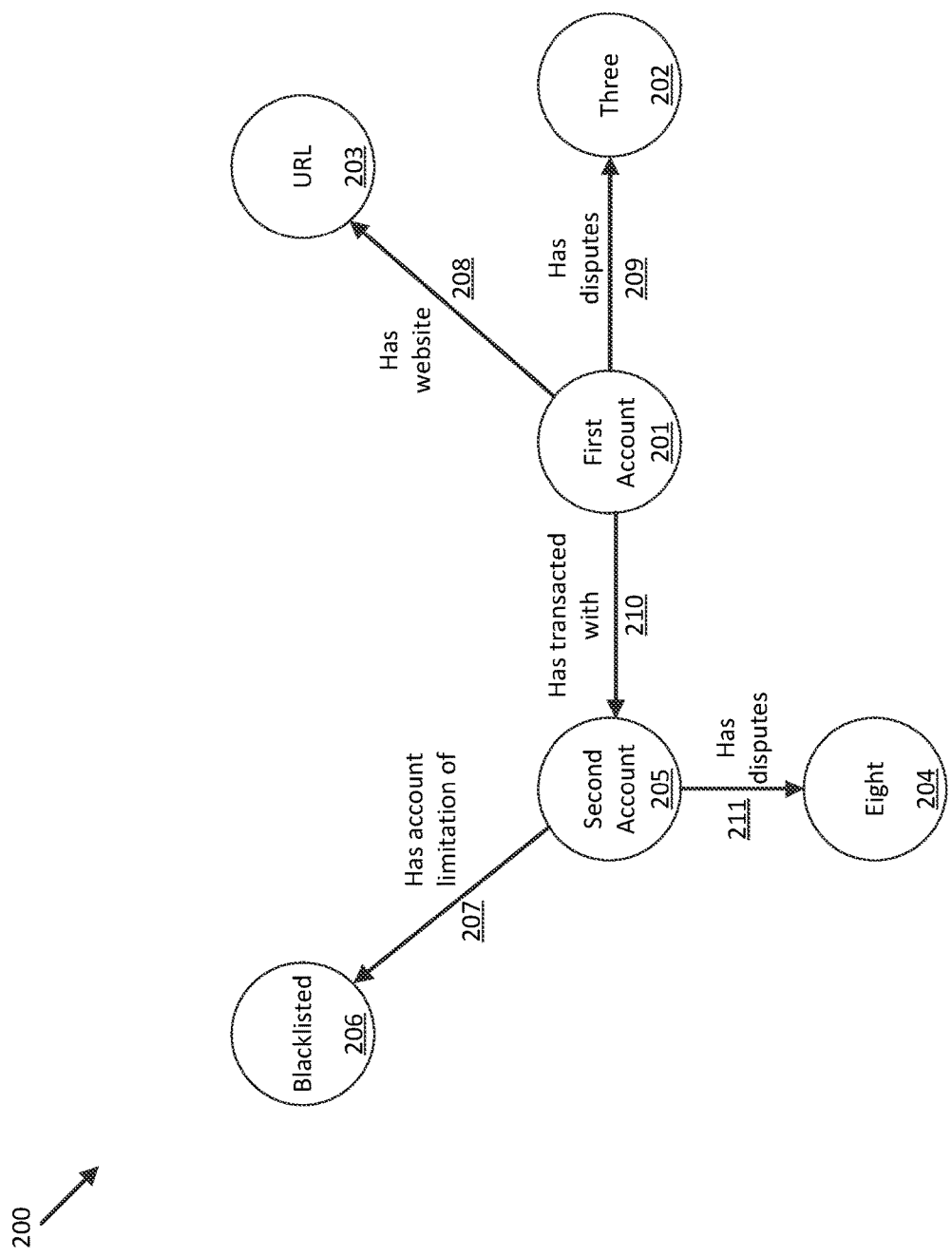
FIG. 2 illustrates an example graph-structured data model in accordance with one or more embodiments of the present disclosure.

At block 102, the computer system may retrieve data for generation of a knowledge graph. FIG. 2 illustrates a simplified knowledge graph 200 for explanatory purposes. Knowledge graph 200 may include nodes 201-206, edges 207-211, and labels for each node and edge. The nodes 201-206 may be entities of the knowledge graph 200. Several example entities are shown in the knowledge graph 200, however entities for a knowledge graph may be other objects, events, accounts, situations, places, and concepts. The edges 207-211 connect nodes in the knowledge graph 200 and may define the relationship between the connected nodes along with the labels (e.g., textual descriptors) for each of the nodes and edges.

The following is an example relationship between nodes 201 and 205 in the knowledge graph 200. The node 201 may represent a first account registered with an electronic service provider. The second node 205 may represent a second account registered with the electronic service provider. The edge 210 that connects the node 201 to the node 205 may represent the concept of having conducted a transaction. Thus, when viewing node 201, edge 210, and node 205, it would be understood that the first account has conducted a transaction with the second account.

The following is another example relationship in the knowledge graph 200 between nodes 205 and 206. The node 206 may represent the concept of being blacklisted from certain actions and/or requesting services provided by the electronic service provider. A user account that is placed on the blacklist is not allowed to perform certain actions using the electronic service provider, such as conducting transactions with other accounts. The edge 207 that connects the node 205 to the node 206 may represent account limitations. Thus, when viewing the node 205, edge 207, and node 206, it would be understood that the second account registered with the electronic service provider has an account limitation of being blacklisted for certain action(s) corresponding to the blacklist of the node 206.

The following is another example relationship in the knowledge graph 200 between nodes 201 and 203. The edge 208 that connects the node 201 to the node 203 may represent a concept of a linked website for the first account, such as a merchant website that a user of the first account linked to the first account upon registration with the electronic service provider. The node 203 may have a label as the URL for the merchant website in such a case. Thus, when viewing the node 201, edge 208, and node 203, it would be understood that the first account has a linked website, which is the URL of the node 203.

The following is yet another example relationship in the knowledge graph 200 between nodes 201 and 202. The edge 209 that connects the node 201 to the node 202 may represent a concept of active disputes for an account, where an active dispute may be an open ticket for a dispute that one account has filed against another account. For example, where the electronic service provider facilitates electronic transactions between user accounts, one account may have filed a dispute against another account for accepting compensation for goods or services but did not provide the goods or services as agreed. The node 202 may represent a number (e.g., three). Thus, when viewing the node 201, edge 209, and node 202, it would be understood that the first account has three active disputes. Similarly, when viewing the node 205, edge 211, and node 204, it would be understood that the second account has eight active disputes.

Referring back to FIG. 1, at block 102 of process 100, the system may retrieve the data for generation of the knowledge graph 200 from a database and/or various other data sources. The data may be associated with a central node in the knowledge graph, such as the first account corresponding to node 201 for example. The first account may be a user account that is under a current adjudication (e.g., investigation) for fraud by the electronic service provider, for example. In some cases, the data may include investigation summaries regarding transactions conducted by the first account and accounts with whom the first account has conducted transactions. An investigation summary may be a textual narrative prepared by a machine or human after reviewing a transaction or account, such as for fraudulent behavior. For example, an investigation summary may include text that indicates that an account has been suspended for suspicious activity such as performing a large number of monetary withdrawals within a threshold period. The investigation summary may be automatically generated and updated in response to events associated with the first account such as disputes filed against the first account by other accounts or the electronic service provider, limitations placed on the first account by the electronic service provider (e.g., transaction timeouts, reduction in permitted transaction velocity, blocking of certain account actions), transactions with fraudulent accounts, and so forth.

The data may further include transaction events or activity logs, media files associated with transactions (e.g., voice/audio files), text files associated with transactions, etc. In some embodiments, the computer system may convert the various data types, which may be unstructured data, into a data format that is more suitable for use in generating the knowledge graph 200. For example, the system may convert voice/audio files to a text format using one or more speech recognition algorithms as would be understood by one of skill in the art. As another example, the system may convert text files containing emojis to a format that is more suitable for generating the knowledge graph 200, such as by deleting emojis or replacing emojis with mapped, synonymous text words.

Figure 3:
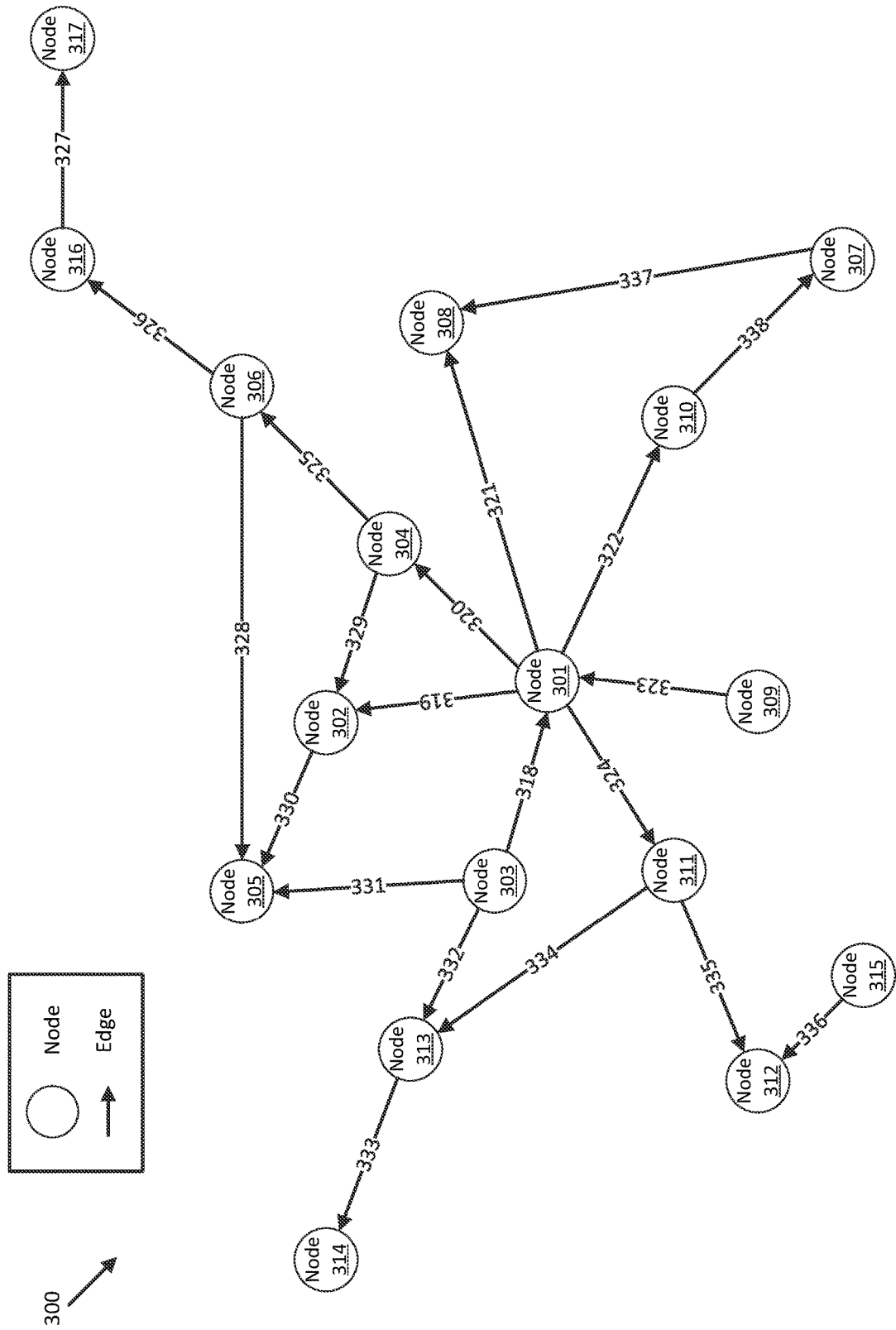
FIG. 3 illustrates an example graph-structured data model in accordance with one or more embodiments of the present disclosure.

At block 104 of the process 100, based on the retrieved data, the computer system may generate the knowledge graph utilizing natural language processing to construct a comprehensive view of the nodes and edges, including labels, through semantic enrichment as would be understood by one of skill in the art. FIG. 3 illustrates an example knowledge graph 300 that is generated by the computer system and to which reference is made herein to illustrate further operations of the process 100. The knowledge graph 300 may include nodes 301-317 and edges 318-338. Although the labels for the nodes 301-317 and the edges 318-338 are omitted in FIG. 3 for simplicity in explaining operations of the process 100, it will be appreciated that the labels of the knowledge graph 300 may be in a text format and include one or more words to describe the various nodes 301-317 and edges 318-338.

At block 106 of the process 100, the computer system may determine a plurality of paths in the knowledge graph 300 using similarity score and sentiment score calculations. The plurality of paths may originate from the central node 301, which may correspond to a user account that is currently under adjudication for example. To facilitate determining the plurality of paths in the knowledge graph 300, the computer system may vectorize the knowledge graph 300. For example, the computer system may use one or more word embedding techniques to vectorize the knowledge graph 300 by taking the various labels for the nodes 301-317 (and/or edges 318-338) and converting them to their numerical vector representation (e.g., real-valued vectors in a predefined vector space). Various word embedding algorithms may be implemented according to embodiments, such as Word2Vec, GloVe, and an embedding layer.

Once the nodes 301-317 of the knowledge graph 300 have been vectorized, the computer system may traverse the knowledge graph 300 to determine groups of nodes that could potentially be paths (e.g., prospective paths). For example, the computer system may begin at the node 301 (e.g., the node under adjudication) and move outwards towards other nodes in the knowledge graph 300 following the edges in the knowledge graph 300.

The computer system may calculate a similarity score between the node 301 and the next node outward from the node 301. For example, the computer system may calculate a similarity score between the node 301 and the node 310. If the computer system determines that the calculated similarity score between the node 301 and the node 310 meets a predefined threshold that indicates that the node 301 and the node 310 are sufficiently similar, the computer system may group the node 301 and the node 310 into a prospective path. The computer system may then continue to determine other nodes that may be grouped into the prospective path. For example, the computer system may then calculate a similarity score between the node 310 and the node 307. If the computer system determines that the similarity score between the node 310 and the node 307 meet the threshold for similarity score, then the node 307 may be added to the prospective path formed by the nodes 301 and 310. As another example, the computer system may then continue to determine if node 308 should be added to the prospective path formed by the nodes 301, 310, and 307, by calculating a similarity score between the node 307 and the node 308. The computer system may determine that the similarity score between the node 307 and the node 308 does not meet the threshold for similarity score, and thus, the node 308 is not added to the prospective path formed by the nodes 301, 310, and 307. When there are no further connected nodes to check for addition to the prospective path (no further nodes connected by an edge to the latest node added to the prospective path) or the connected node(s) fail to meet the similarity score threshold, the computer system may conclude the prospective path's node length and nodes.

The computer system may traverse through the knowledge graph searching for other prospective paths as discussed in the aforementioned example. Once the prospective paths have been determined, the computer system may determine the plurality of paths from the prospective paths by calculating sentiment scores for the prospective paths. For example, for the prospective path discussed above, which was formed by the nodes 301, 310, and 307, the computer system may calculate a sentiment score for each of the nodes for comparison. For example, the computer system may calculate the sentiment score for the node 301 and the node 310 and compare the respective sentiment scores. If the respective sentiment scores meet a threshold indicating that the nodes 301 and 310 share the same or similar sentiment, then the nodes 301 and 310 may be maintained in the prospective path. The computer system may similarly compare the sentiment scores of the nodes 310 and 307 to conclude that the nodes 310 and 307 meet the sentiment threshold indicating that they share the same or similar sentiment. When a node does not meet the sentiment threshold, the computer system may remove the node from the prospective path as well as the remaining nodes on the path after the removed node, which effectively reduces the size of the prospective path. By reducing the size of prospective paths using sentiment analysis, computer operations may be avoided for later processing of the prospective paths, which provides for more efficient computer processing. Thus, once the prospective paths have had their sentiment analyzed, and any prospective paths, that did not have a sufficiently similar sentiment amongst its nodes, have been eliminated or shortened, the computer system may reach an end state with regard to determining the plurality of paths in the knowledge graph 300.

It will be appreciated that various techniques may be used to calculate similarity scores between nodes and sentiment scores for nodes. For example, in calculating similarity scores, the vector representations of nodes may be analyzed to determine cosine distance or proximity measure between vectors. Various sentiment libraries are available to perform the sentiment analysis to calculate the sentiment scores, such as Flair, NLTK, and FastText.

Figure 4:
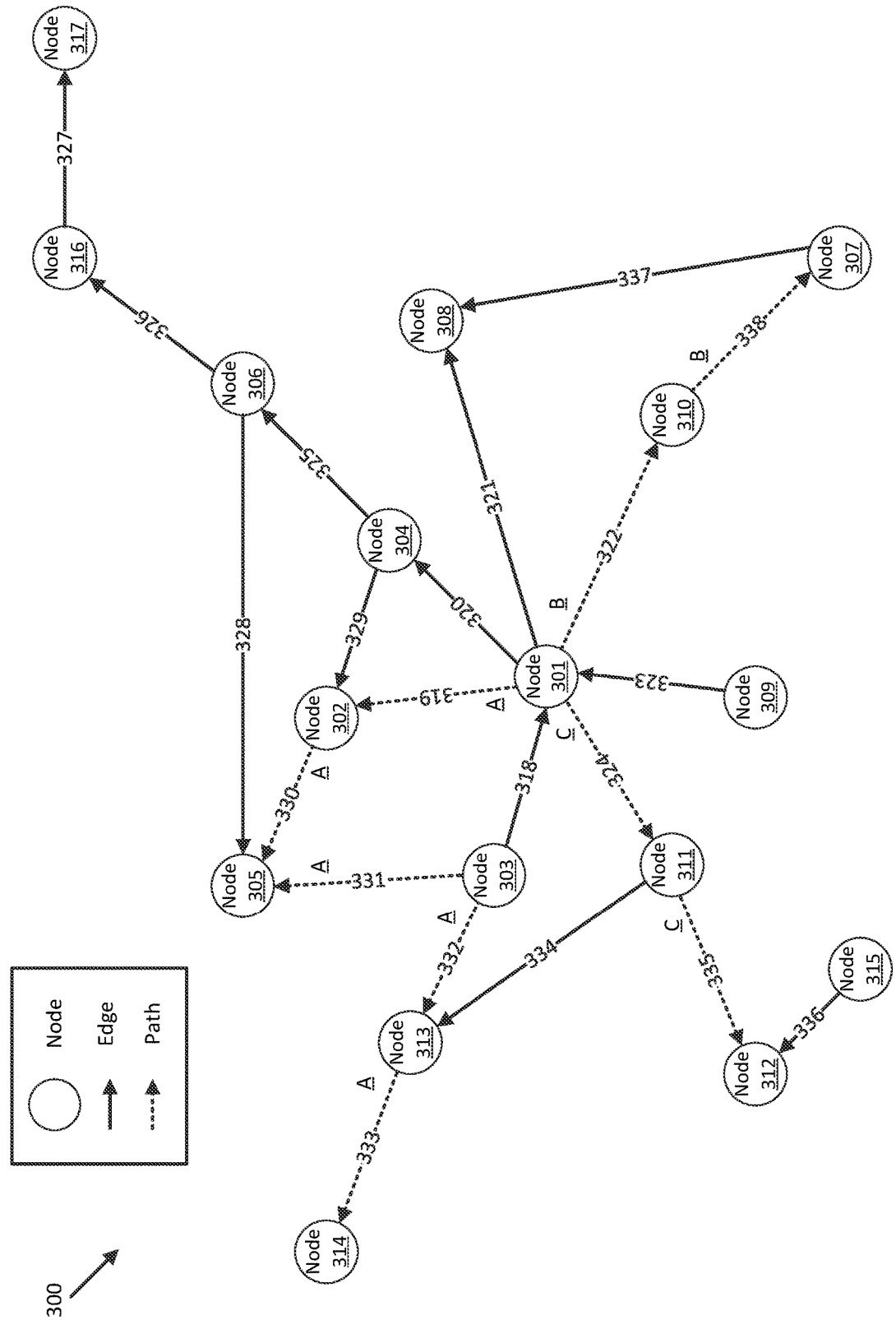
FIG. 4 illustrates an example graph-structured data model in which a plurality of paths have been determined in accordance with one or more embodiments of the present disclosure.

FIG. 4 illustrates example paths A, B, and C which may have been determined by the computer system based on the knowledge graph 300. Path A may include nodes 301, 302, 305, 303, 313, and 314. Path B may include nodes 301, 310, and 307, and may correspond to the example path discussed above for block 106. Path C may include nodes 301, 311, and 312. In some embodiments the paths may also include the edges that connect the nodes of the paths. As previously mentioned, the determined paths may be referred to as the "activated neural pathways" in the knowledge graph 300 according to certain embodiments.

Referring back to FIG. 1, at block 108 of the process 100, the computer system may rank the plurality of paths that were determined, by the computer system, based on the knowledge graph 300. In some embodiments, the computer system may rank the plurality of paths based on a combination of the similarity scores and sentiment scores that were calculated for each path. For example, the computer system may calculate a standard deviation for the similarity scores of each path and a standard deviation for the sentiment scores for each path. Based on the standard deviation for the similarity scores and the standard deviation for the sentiment scores, the computer system may be able to determine how closely associated the similarity scores and sentiment scores for each path is, which may be an indication of how "activated" the path is.

For example, the computer system may combine the standard deviation score of the similarity scores and the standard deviation score of the sentiments scores for each of the different paths to determine a single value for each path that the computer system may use to compare the paths and determine the order of ranking. In some embodiments, the standard deviation in similarity score and the standard deviation in sentiment score may be inputted to a weighed function that provides a single output that can be compared amongst the different paths.

Thus, paths that have a sufficient closeness in similarity score and sentiment score to be considered "active neural pathways" but have a wider spread between such scores may rank lower than paths that have a narrower spread between similarity and sentiment scores (e.g., more "active").

At block 110, the computer system may identify one or more paths from the ranked paths. For example, in an embodiment, the computer system may identify a highest-ranking path. In another embodiment, the computer system may identify a set of the higher-ranking paths, such as the three highest-ranking paths.

In an embodiment where the computer system identifies the highest-ranking path, the computer system may identify a data source associated with the identified path. For example, the computer system may determine that one of the nodes in the identified path corresponds to another user account that the user account under adjudication has transacted with in the past. The computer system may retrieve data associated with the other user account for use as a data source from which the computer system may reference when determining an adjudication for the current user account under adjudication. In this regard, the highest-ranking path may be considered a path that has the strongest correlation to the user account that is under adjudication, and thus the computer system may use the data sources retrieved based on the highest-ranking path to make an adjudication on the user account.

For example, the other user account may have had a fraud case filed against it in the past, for which an investigation summary for the other user account had been recorded. The computer system may retrieve the investigation summary, which may provide an evaluation of the other user account for the fraud case.

At block 112, the system may determine an adjudication for the node 301 based on the identified path(s). For example, the computer system may use the investigation summary from the highest-ranked path to provide a template investigation summary for the current adjudication of the user account associated with the node 301. For example, in some embodiments, the adjudication may be semi-automated, where the computer system may provide a recommendation for the adjudication to an operator to perform a final adjudication. The recommendation may include a template investigation summary that may be provided to the operator, where the template may be generated by the computer system based on the data source of the identified highest-ranked path.

In another embodiment, where the computer system identifies more than one of the ranked paths, the computer system may adjudicate the user account associated with the node 301 based on a majority sentiment for the identified ranked paths. For example, where there are three of the highest-ranked paths identified, the computer system may use a majority sentiment (e.g., two of the three paths) to adjudicate the user account. As an illustration, two of the three identified ranked paths may have an overall negative sentiment (e.g., sentiment scores of nodes in their paths are centered around a threshold for negative sentiment). The computer system may thus apply a negative sentiment adjudication to the user account, such as filing a fraud adjudication against the user account.

As another illustration, two of the three identified ranked paths may have an overall positive sentiment (e.g., sentiment scores of nodes in their paths are centered around a threshold for positive sentiment). The computer system may in this case apply a positive sentiment adjudication to the user account, such as dismissing the adjudication against the user account.

Figure 5:
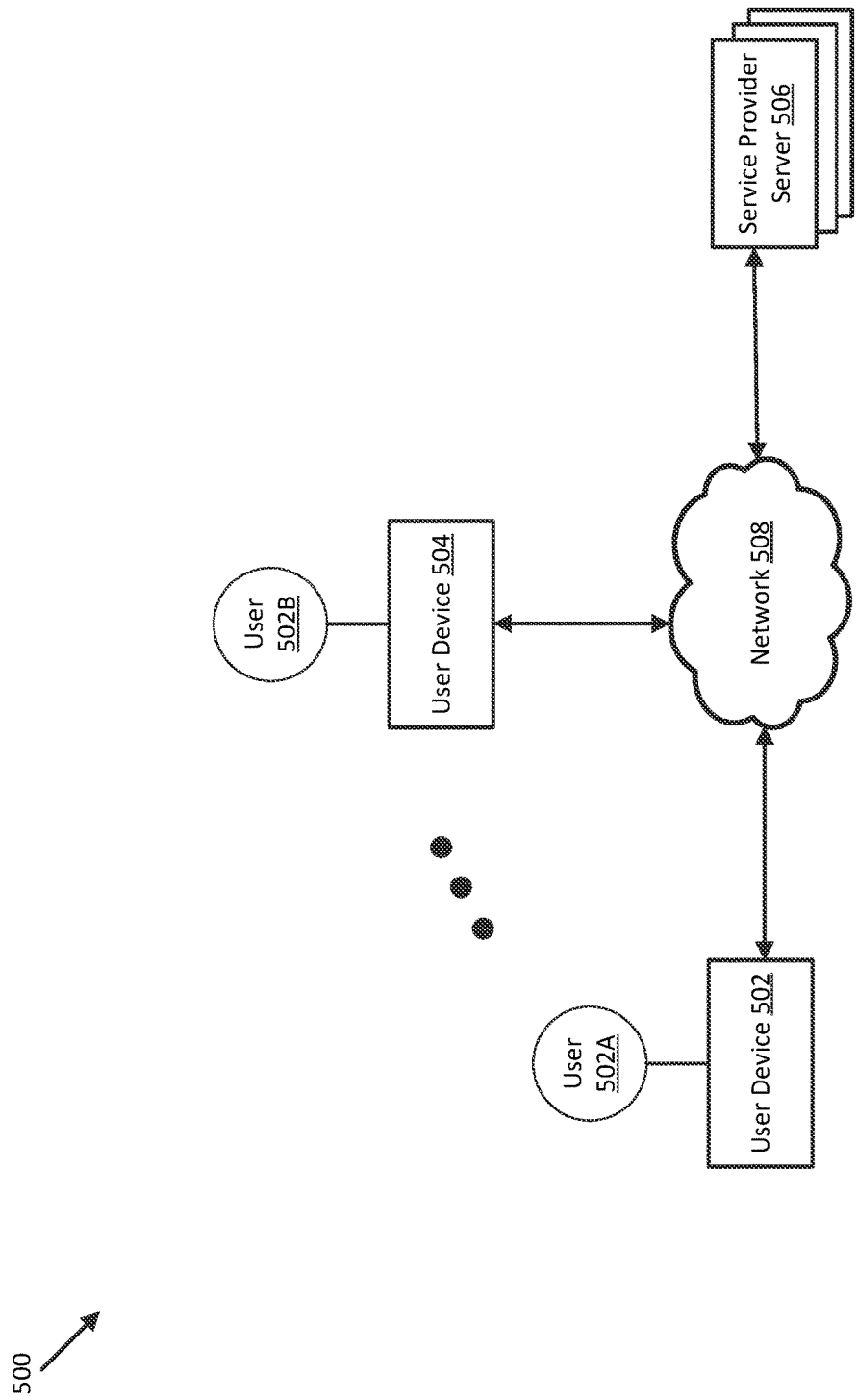
FIG. 5 illustrates a block diagram of a networked system suitable for implementing one or more embodiments of the present disclosure.

Referring now to FIG. 5, a block diagram of a networked system 500 configured to facilitate one or more processes in accordance with various embodiments of the present disclosure is illustrated. System 500 includes a user device 502, a user device 504, and an electronic service provider server(s) 506. A user 502A is associated with user device 502, where user 502A can provide an input to service provider server 506 using user device 502. A user 502B is associated with user device 504, where user 502B can provide an input to service provider server 506 using user device 502B.

User device 502, user device 504, and service provider server 506 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 500, and/or accessible over a network 508. Each of the memories may be non-transitory memory. Network 508 may be implemented as a single network or a combination of multiple networks. For example, in various embodiments, network 508 may include the Internet or one or more intranets, landline networks, and/or other appropriate types of networks.

User device 502 may be implemented using any appropriate hardware and software configured for wired and/or wireless communication over network 508. For example, in some embodiments, user device 502 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 502 may include one or more browser applications which may be used, for example, to provide a convenient interface to facilitate responding to recipient account detail requests over network 508. For example, in one embodiment, the browser application may be implemented as a web browser configured to view information available over the internet and respond to requests sent by service provider server 506. User device 502 may also include one or more toolbar applications which may be used, for example, to provide client-side processing for performing desired tasks in response to operations selected by user 502A. In one embodiment, the toolbar application may display a user interface in connection with the browser application.

User device 502 may further include other applications as may be desired in particular embodiments to provide desired features to user device 502. For example, the other applications may include an application to interface between service provider server 506 and the network 508, security applications for implementing client-side security features, programming client applications for interfacing with appropriate application programming interfaces (APIs) over network 508, or other types of applications. In some cases, the APIs may correspond to service provider server 506. The applications may also include email, texting, voice, and instant messaging applications that allow user 502A to send and receive emails, calls, and texts through network 508, as well as applications that enable the user to communicate to service provider server 506. User device 502 includes one or more device identifiers which may be implemented, for example, as operating system registry entries, cookies associated with the browser application, identifiers associated with hardware of user device 502, or other appropriate identifiers, such as those used for user, payment, device, location, and or time authentication. In some embodiments, a device identifier may be used by service provider server 506 to associate user 502A with a particular account maintained by the service provider server 506. A communications application with associated interfaces facilitates communication between user device 502 and other components within system 500. User device 504 may be similar to user device 502.

Service provider server 506 may be maintained, for example, by an online service provider which may provide electronic transaction services. In this regard, service provider server 506 includes one or more applications which may be configured to interact with user device 502 and user device 504 over network 508 to facilitate the electronic transaction services. Service provider server 506 may maintain a plurality of user accounts (e.g., stored in a user account database accessible by service provider server 506), each of which may include account information associated with individual users. Service provider server 506 may perform various functions, including communicating over network 508 with a payment network and/or other network servers capable a transferring funds between financial institutions and other third-party providers to complete transaction requests and process transactions.

Figure 6:
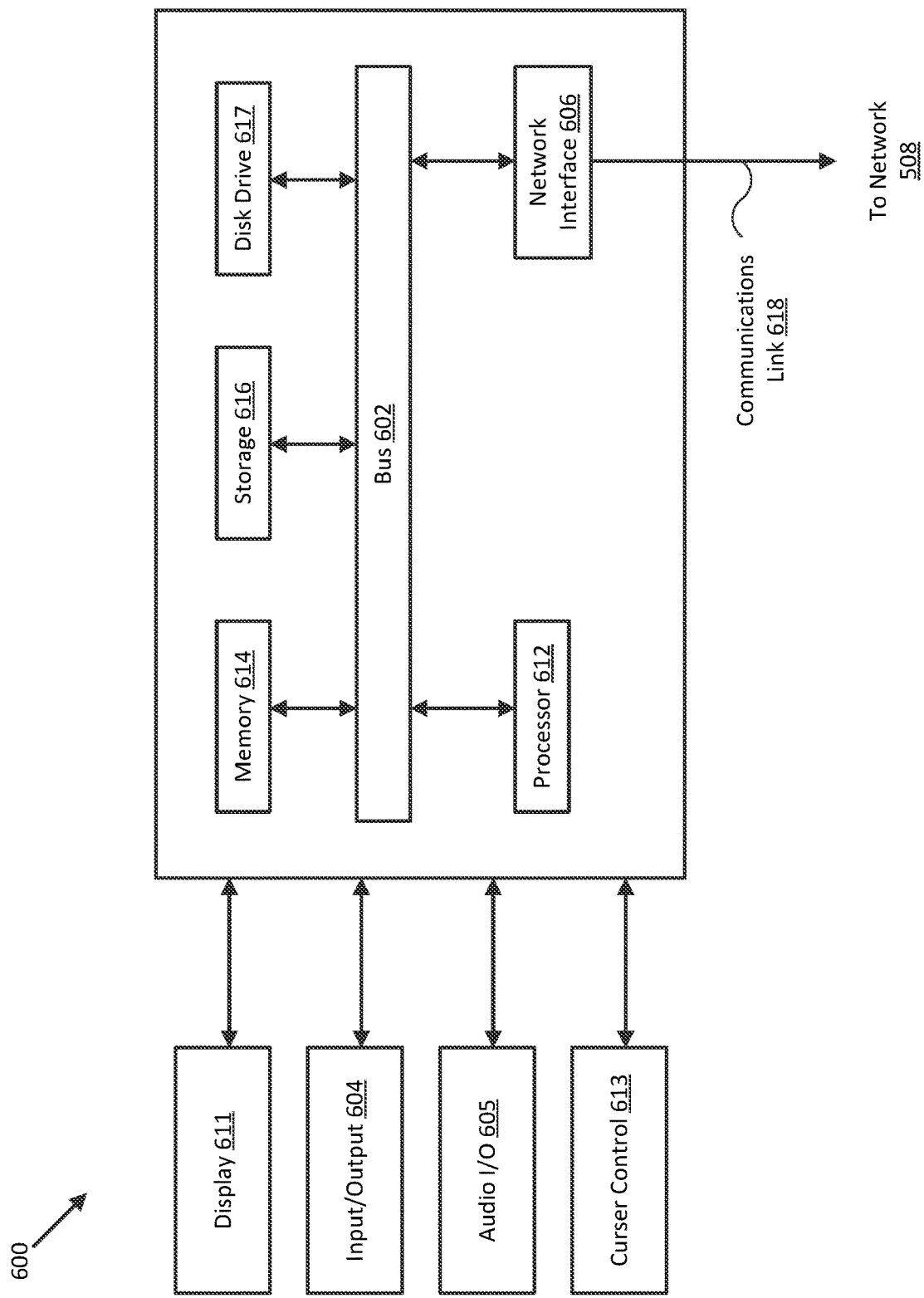
FIG. 6 illustrates a block diagram of a computer system in accordance with one or more embodiments of the present disclosure.

FIG. 6 illustrates a block diagram of a computer system 600 suitable for implementing one or more embodiments of the present disclosure. It should be appreciated that each of the devices utilized by users, entities, and service providers (e.g., computer systems) discussed herein may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component, such as a display 611 and a cursor control 613 (such as a keyboard, keypad, mouse, etc.). I/O component 604 may further include NFC communication capabilities. An optional audio I/O component 605 may also be included to allow a user to use voice for inputting information by converting audio signals. Audio I/O component 605 may allow the user to hear audio. A transceiver or network interface 606 transmits and receives signals between computer system 600 and other devices, such as another user device, an entity server, and/or a provider server via network 508. In one embodiment, the transmission is wireless, although other transmission mediums and methods may also be suitable. Processor 612, which may be one or more hardware processors, can be a micro-controller, digital signal processor (DSP), or other processing component, processes these various signals, such as for display on computer system 600 or transmission to other devices via a communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer-readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network 508 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A computer system comprising:
a non-transitory memory storing instructions; and
one or more hardware processors configured to read the instructions and cause the computer system to perform operations comprising:
generating a knowledge graph having a plurality of nodes, wherein a first node of the plurality of nodes corresponds to a first user account that is under a current adjudication;
calculating a respective sentiment score of each of the plurality of nodes in the knowledge graph;
determining a plurality of paths based on the knowledge graph, wherein each of the plurality of paths comprises a set of nodes including the first node, and wherein the one or more nodes in the set of nodes are added to the path based on a determination that a similarity score between the sentiment score of a last node in the path and a sentiment score of a next node to be added to the path meets a specified threshold;
identifying one or more paths from the plurality of paths based on a ranking of the plurality of paths, wherein the ranking is determined based at least in part on the similarity score and the sentiment scores calculated for each of the paths, and wherein a second node different from the first node in the identified one or more paths corresponds to a second user account that has previously been adjudicated; and
determining the current adjudication for the first node based on at least one of the identified paths.

2. The computer system of claim 1, wherein determining each of the plurality of paths further comprises:
determining that the similarity score meets a first threshold; and
determining that the sentiment score meets a second threshold.

3. The computer system of claim 1, wherein the operations further comprise vectorizing each node in the knowledge graph, and wherein the determining the plurality of paths in the knowledge graph is based on a calculated similarity score and a calculated sentiment score between each of the vectorized nodes in the path meeting respective thresholds.

4. The computer system of claim 1, wherein the generating the knowledge graph includes converting a media file into text for at least one node in the knowledge graph.

5. A method, comprising:
retrieving data associated with a first user account for a service provider, wherein the first user account is under a current adjudication;
based on the data, generating a knowledge graph having a plurality of nodes, wherein a first node of the plurality of nodes corresponds to the user account;
calculating a sentiment score for each node in each of a plurality of paths of the knowledge graph;
determining a plurality of paths of the knowledge graph, wherein each of the plurality of paths originates from the first node, wherein the determining the plurality of paths comprises traversing the knowledge graph, beginning from the first node and calculating a similarity score between nodes of the plurality of paths of the knowledge graph during the traversing, and wherein similarity scores and the sentiment scores for each of the plurality of paths meet a respective threshold for a closeness amongst the similarity scores and sentiment scores;
identifying one or more paths from the plurality of paths based on a ranking of the plurality of paths, wherein the ranking is based at least in part on the similarity score and the sentiment scores calculated for each of the paths, and wherein a second node in the identified one or more paths corresponds to a second user account that has previously been adjudicated; and determining the current adjudication for the first node based on at least one of the identified paths.

6. The method of claim 5, further comprising ranking the plurality of paths based on a standard deviation of the similarity scores and a standard deviation of the sentiment scores for each of the plurality of paths, wherein the second node is on a highest ranked path of the identified one or more paths.

7. The method of claim 5, further comprising vectorizing each node in the knowledge graph to convert a textual label for each node into a vector representation, wherein the determining the plurality of paths in the knowledge graph is based on calculating a similarity score and a sentiment score using the vector representation.

8. A non-transitory machine-readable medium having instructions stored thereon, wherein the instructions are executable to cause a machine of a system to perform operations comprising:

accessing a knowledge graph having a plurality of nodes, wherein a first node of the plurality of nodes corresponds to a first user account that is under a current adjudication;

calculating a sentiment score of each of the plurality of nodes in the knowledge graph;

determining a plurality of paths of the knowledge graph, wherein each of the plurality of paths originates from the first node, wherein the nodes on each path have similarity scores with a previous node that meet a predefined threshold, and wherein the similarity scores are calculated based on the sentiment scores between the node and the previous node;

identifying one or more paths from the plurality of paths based on a ranking of the plurality of paths, wherein the ranking is determined based at least in part on the similarity scores and the sentiment scores calculated for each of the paths, and wherein a second node in the identified one or more paths corresponds to a second user account that has previously been adjudicated; and determining the current adjudication for the first node based on at least one of the identified paths.

9. The non-transitory machine-readable medium of claim 8, wherein the operations further comprise reducing a node length of at least one of the determined plurality of paths based on the calculated sentiment score for one or more removed nodes in the at least one of the determined plurality of paths.

10. The non-transitory machine-readable medium of claim 8, wherein a highest-ranking path of the plurality of paths is identified, wherein the operations further comprise retrieving a data source corresponding to the highest-ranking path, and wherein the data source is used as a template for the determining the current adjudication for the first node.

11. The non-transitory machine-readable medium of claim 8, wherein the operations further comprise ranking the plurality of paths, wherein the determining the current adjudication for the first node is based on a previous adjudication corresponding to the second node, wherein the second node is in a highest ranked path of the identified one or more paths.

12. The non-transitory machine-readable medium of claim 8, wherein the current adjudication comprises a dismissal or a filing of fraud for the other account corresponding to the first node.

13. The system of claim 1, wherein the operations further comprise activating a highest ranked path of the plurality of paths.

14. The system of claim 13, wherein the operations further comprise tagging the highest ranked path with a source identifier that identifies a data source that indicates the second user account was previously adjudicated as having been engaged in a fraudulent activity.

15. The system of claim 1, wherein the generating the knowledge graph is based at least in part by data retrieved from a database, the data comprising an investigation summary of transactions conducted by the first user account.

16. The system of claim 15, wherein the data comprises audio data or emojis, and wherein the operations further comprise converting the audio data or the emojis to a synonymous textual format.

17. The system of claim 1, wherein the ranking is determined at least in part based on a standard deviation of the similarity scores or a standard deviation of the sentiment scores for each of the identified one or more paths.

18. The system of claim 17, wherein the standard deviation of the similarity scores or the standard deviation of the sentiment scores is calculated as a standard deviation score, and wherein the ranking is further determined by:

putting the standard deviation score through a weighed function that generates a single output for each of the identified paths; and comparing the single output generated by each of the identified one or more paths with the single output generated by other ones of the identified one or more paths.

19. The system of claim 1, wherein the determining the current adjudication comprises adjudicating the first node in a same manner as the second node.

20. The system of claim 1, wherein a majority of the nodes in the best ranked path have a first adjudicated outcome, and wherein the determining the current adjudication comprises assigning the first adjudicated outcome to the first node.

* * * * *